Nov. 16, 1971   W. O. HANSEN   3,619,877
CAPACITOR ASSEMBLY

Original Filed Jan. 22, 1968   3 Sheets-Sheet 1

INVENTOR
WILBUR O. HANSEN
BY
J David Blumenfeld
ATTORNEY

Nov. 16, 1971 W. O. HANSEN 3,619,877

CAPACITOR ASSEMBLY

Original Filed Jan. 22, 1968 3 Sheets-Sheet 2

INVENTOR
WILBUR O. HANSEN

BY
ATTORNEY 3,619,877
Patented Nov. 16, 1971

1

3,619,877
CAPACITOR ASSEMBLY
Wilbur O. Hansen, Waynesboro, Va., assignor to
General Electric Company
Original application Jan. 22, 1968, Ser. No. 699,399, now
Patent No. 3,527,988, dated Sept. 8, 1970. Divided
and this application Feb. 2, 1970, Ser. No. 7,624
Int. Cl. H01g 13/00
U.S. Cl. 29—25.41                                   2 Claims

ABSTRACT OF THE DISCLOSURE

A capacitor assembly having a large heat transfer surface and housing a plurality of capacitors which may be connected as a lumped capacitance. A plurality of thermally conductive tubes are mounted substantially parallel, adjacent tubes contacting each other to define passages for a cooling medium. At least one capacitor is supported within each tube. The capacitors are thermally connected to the walls of the tubes in which they are contained in order to provide for heat transfer thereto. Leads extending from capacitor terminals may protrude from opposite ends of each tube. The tubes may also be electrically conductive so that capacitors may be conveniently connected in parallel by electrically connecting one terminal of each capacitor to the wall of the tube in which it is contained and the other terminal of each capacitor to a common wire. Wires to which the other terminal of each capacitor is to be connected may pass through each tube in spaced relationship thereto so that a short lead is required to make the connection.

This application is a division of Ser. No. 699,399, filed Jan. 22, 1968, now Pat. No. 3,527,988 and entitled "Capacitor Assembly."

BACKGROUND OF THE INVENTION

This invention relates to a compact capacitor assembly. More specifically, it relates to a compact capacitor assembly having good heat transfer characteristics.

In many applications, it is necessary to provide a large, lumped capacitance composed of a number of individual capacitors. For example, large filter capacitors, composed of a plurality of capacitors connected in parallel, may be used to filter the output of a power generation system. Also, a number of capacitors may be connected in series to form a lumped capacitance in a tuned filter. Even capacitors having a relatively low power factor may produce large amounts of heat when used in these applications. Since heat may damage capacitor components and cause inefficiency of operation, it is necessary to provide a capacitor assembly in which the heat produced by the capacitors is easily dissipated. A typical prior art arrangement for cooling a capacitance unit other than by normal free convection and radiation comprises the mounting of individual capacitor enclosures on a panel so that air may be blown across it. Such an arrangement is heavy due to the weight of the individual enclosures. Further, the usual configuration of standard capacitor enclosures restricts the size, shape, and mechanical features of the assembly. Other schemes for cooling a plurality of capacitors include the mounting of capacitors on the outer surface of a hollow support. In this arrangement, the number of capacitors which may be included in any one unit is limited. Furthermore, since the capacitors are contained on the outer surface of each support, a plurality of such units may not be compactly grouped since capacitors in one unit would tend to heat capacitors in the next unit.

It is therefore, an object of this invention to provide a lightweight and compact manner of packaging a plurality of capacitors in an assembly having very good heat transfer characteristics.

It is often desirable to provide a capacitance unit having very good high frequency characteristics. For example, a capacitance unit may be used to filter high frequency signals from a current flowing from a source to a load by bypassing the high frequency signals to ground. In order for the filter capacitor unit to be capable of passing frequencies in the mega-hertz range to ground, it is necessary that the capacitors present a low impedance to high frequency signals. Typical prior art filter capacitor units for low frequencies include standard capacitors which have both long internal and external leads. These leads provide a high impedance to high frequency signals and render the filter capacitor unit incapable of filtering out high frequency signals. This deficiency is commonly remedied by providing a feed-through capacitor for the filtering of high frequency signals in addition to the parallel-connected capacitors. Inclusion of this feed-through capacitor in addition to a filter capacitance unit requires extra mounting hardware, which adds to the weight of the unit, and adds to the bulk of the assembly.

It is, therefore, a further object of this invention to provide a capacitor assembly of the type described having very good high frequency response, without the need for a separate feed-through capacitor.

SUMMARY OF THE INVENTION

Briefly stated, in accordance with the present invention, there is provided a compact capacitor assembly, having relatively large surface exposed to a cooling air stream for heat transfer, consisting of a plurality of preferably thermally conductive tubes mounted substantially parallel to each other. Adjacent tubes contact each other so as to define passages through which a cooling medium may flow. At least one capacitor is supported within the thermally connected to each tube. Leads extending from each of the capacitor terminals may be connected as desired. For example, leads connected to each capacitor terminal may extend from opposite sides of each tube so that the capacitors may be connected in series. In a further embodiment of the present invention, tubes which are also electrically conductive may be utilized so that one terminal of each capacitor may be electrically connected to the wall of the tube in which it is contained to provide a low impedance path to ground for high frequency filtering. The connection resulting provides convenient parallel connection if desired.

BRIEF DESCRIPTION OF THE DRAWINGS

The foregoing objects and features of novelty which characterize the invention as well as other objects of the invention are pointed out with particularity in the claims annexed to and forming a part of the present specification. For a better understanding of various embodiments of the invention, its advantages, and specific objects attained with its use, reference should be made to the accompanying drawings and descriptive matter in which there are illustrated and described preferred embodiments of the invention.

Of the drawings.

DESCRIPTION OF THE INVENTION

Figure 1:
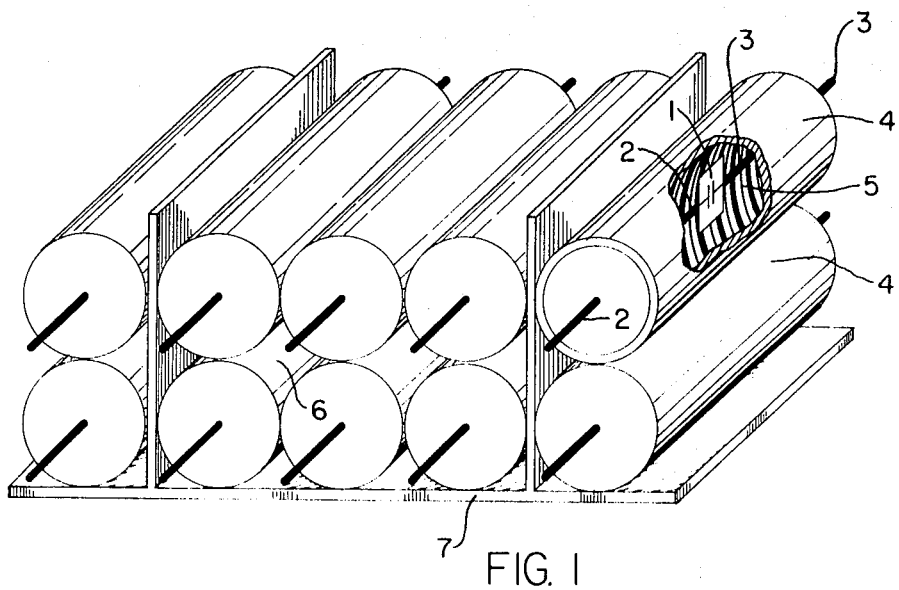
FIG. 1 is an isometric view of an assembly constructed in accordance with the present invention, a portion of one tube being broken away to show a capacitor therein.

FIG. 1 shows a capacitor assembly constructed in accordance with the present invention. A capacitor 1, having leads 2 and 3 connected to its terminals, is supported within a thermally conductive tube 4 and thermally connected thereto to form a tube unit. As seen in FIG. 1, the capacitor 1 is supported in and thermally connected to the tube 4 by thermally conductive potting compound 5. Encapsulating the capacitors within the potting compound provides protection of the capacitor elements against humidity. In applications where protection against humidity is unnecessary, alternative means may be used to support and thermally connect the capacitor to the tube. For example, a simple friction fit may be resorted to. A plurality of similar tube units are mounted substantially parallel so that adjacent tubes contact each other to define passages 6 through which a cooling medium may flow. Since adjacent tubes contact each other only along a line of their circumferences, virtually all of the surface of each tube is exposed, thus providing for optimum heat transfer.

Any number of tube units may be included in an assembly, the number of tube units being determine by the number of capacitors the user desires to include. The tubes may be grouped together in any geometrical configuration. As shown in FIG. 1, the tube units, when viewed from the front, define a substantially rectangular form. This arrangement provides for the maximum size of the passages 6. However, three tube units may be grouped to define a triangular form, six tube units may be grouped to define a hexagonal form, or any number of tube units may be grouped together as desired. The tubes may be dip brazed to each other, eliminating the need for conventional hardware in the assembly, thus reducing its weight. Mounting of the tubes may be accomplished in any convenient manner. In the embodiment shown in FIG. 1, the tubes are bonded to a mounting bracket 7. If desired, they may be suspended from a strap wrapped around the tubes, or the assembly could be otherwise supported. Leads 2 and 3 may project from opposite ends of the tubes 4, and may be connected as desired.

Further embodiments and various applications of the present invention are illustrated in FIGS. 2 through 5. The same reference numerals are used to denote corresponding components in each figure.

Figure 2:
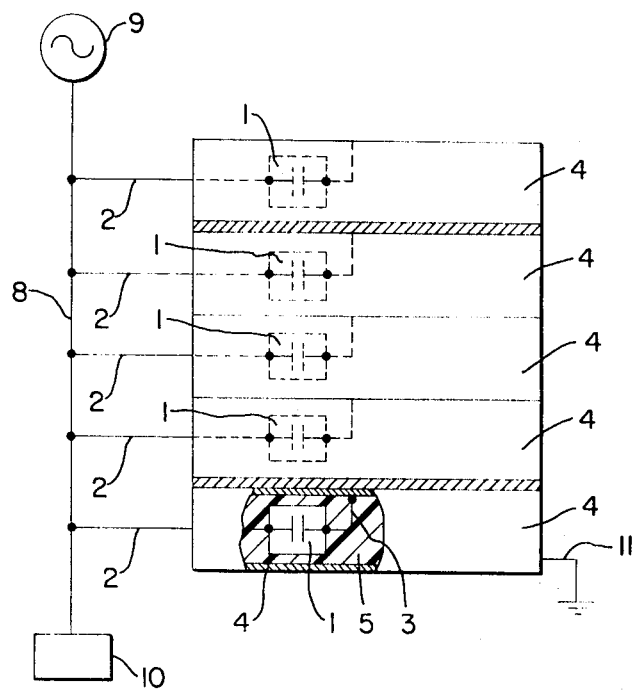
FIG. 2 is a partially diagrammatic and partially schematic plan view of an embodiment of the present apparatus in which the capacitors are connected in parallel.

The arrangement shown in FIG. 2 is particularly suited for use as a filter capacitor for filtering a voltage carried by bus wire 8 which is connected between source 9 and load 10. In order to facilitate connection of the capacitors in parallel, the tubes 4, as well as mounting bracket 7, are electrically as well as thermally conductive. Leads 3 electrically connected one terminal of each capacitor 1 to the wall of the tube 4 in which it is contained, while leads 2 of each capacitors are connected to the bus wire 8. The entire assembly may be conveniently grounded at one point 11. It is seen that in this embodiment of the present invention, the assembly serves to house compactly a plurality of capacitors which are conveniently connected in parallel between a source and ground, and provides for their cooling.

Figure 3:
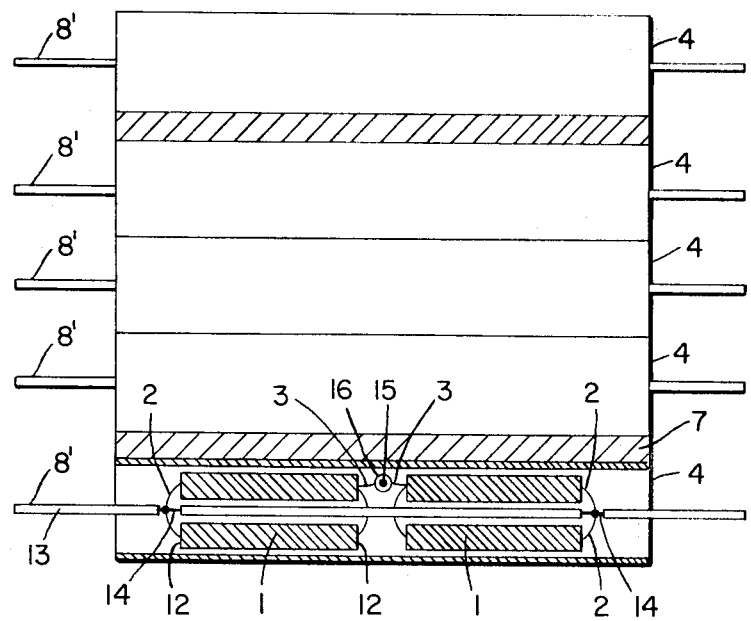
FIG. 3 is a diagrammatic plan view of an embodiment of the present invention particularly suited for high-frequency application.
Figure 4:
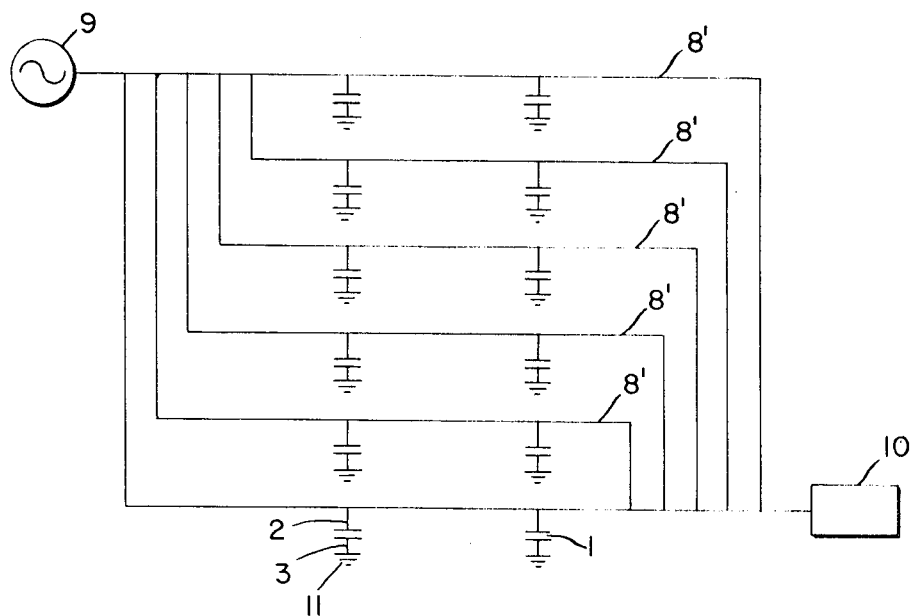
FIG. 4 is a schematic representation of the apparatus shown in FIG. 3 connected between a source and a load.

The embodiment diagrammatically shown in FIG. 3 and schematically shown in FIG. 4 displays very good high frequency characteristics. As best seen in FIG. 3, bus wire 8 consists of a plurality of wires 8' provided with insulation 13. Each wire 8' passes through a tube in spaced relationship thereto. Two separate capacitors as shown, or more, are included in each tube unit to provide for a large lumped capacitance. Tubular capacitors 1 are utilized and mounted concentrically with the wires 8'. A film dielectric capacitor, such as one consisting of metallized paper, mylar, or similar materials is suited for this application. Leads 2 and 3 are connected to the ends 12 of each capacitor 1 by means such as soldering to a metal which is sprayed thereon. Leads 2 of each capacitor 1 are connected to the bus wire 8' through breaks 14 in the insulation 13. A hole 15 may be provided in the wall of each tube in close proximity to the adjacent ends 12 of the capacitors 1 to receive the leads 3. Electrical connection of the leads 3 to the wall of the tube 4 is effected by filling each hole 15 with solder 16 to bond the leads 3 therein or by welding or any other of various means to make such connections. This arrangement is advantageous in that leads 2 and 3 are short. Lead 2 is only as long as the distance from the metal sprayed end of the capacitor to the wire 8', and lead 3 is only as long as the distance from the metal sprayed end of the capacitor to the wall of the tube. Since leads 2 and 3 are short, they present a low impedance to frequencies in the mega-hertz range. Thus, the unit shown in FIGS. 3 and 4 will effectively filter out high frequency signals and provide very good high frequency characteristics without the need for a separate feed-through capacitor.

It is obvious that the connections to the wall and to the bus, as shown in FIG. 3 could be interchanged such that the bus connection is made at the center of the tube and the connection to the wall is made at the ends.

As best seen in FIG. 4, this arrangement provides an additional advantage in that the wire 8' may be of equal length so that the flow of power between the source 9 and the load 10 is equally distributed among each of the wires 8'.

Figure 5:
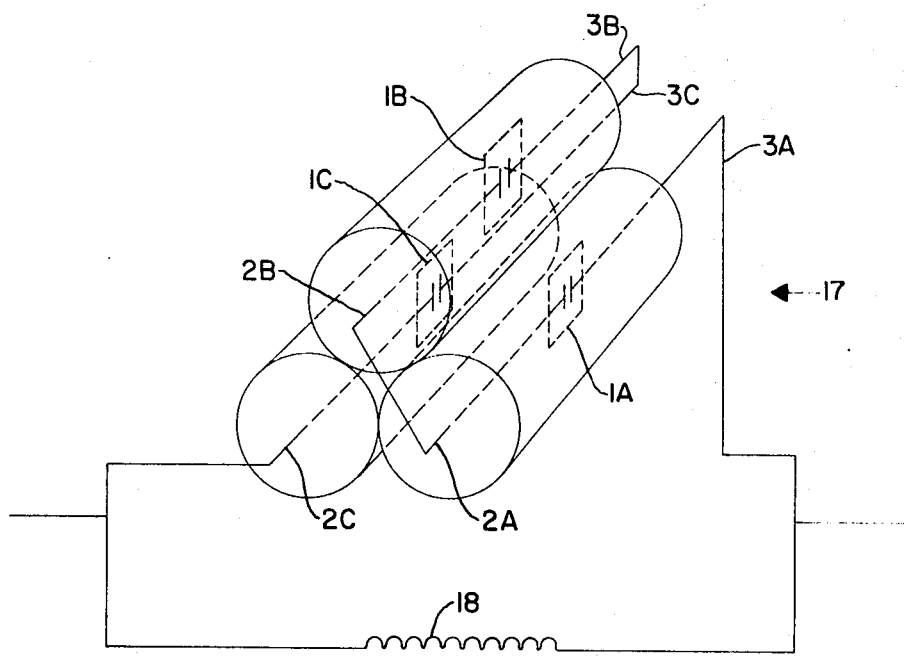
FIG. 5 is a partially isometric and partially schematic view of an embodiment of the present invention in which the capacitors are connected in series.

The present invention is also suited for the compact packaging and cooling of capacitors connected in series. FIG. 5 shows a shunt L-C trap circuit for connection in a filter. Reference numeral 17 indicates a typical lumped capacitance consisting of three tube units including capacitors 1A, 1B and 1C. This capacitance is connected in parallel with inductor 18. Lead 2C of capacitor 1C is connected to one terminal of inductor 18, and lead 3A of capacitor 1A is connected to the other terminal of inductor 18. In order to connect the capacitors in series, lead 2A is connected to lead 2B, and lead 3B is connected to lead 3C. In this embodiment, the capacitors are electrically isolated from and thermally connected to the tubes in which they are contained thus providing an effective manner of compactly packaging and cooling capacitors connected in series.

It is recognized that a series L-C trap circuit can similarly be contructed by connecting the capacitors in parallel.

What is claimed as new and desired to be secured by Letters Patent of the United States is:

1. A method for fabricating a capacitor assembly having good high frequency response, comprising:
   (a) providing an assembly consisting of a plurality of hollow, thermally and electrically conductive tubes fastened together with their axes in parallel, said tubes thereby constituting a common electrical path,
   (b) mounting at least one capacitor in each of said tubes, (c) connecting one lead of each capacitor to wall of its associated tube and thereby to the common electrical path to minimize the lead length and the high frequency impedance presented by said lead.

2. A method for fabricating a capacitor assembly having good high frequency response, comprising:
(a) providing a plurality of thermally and electrically conductive tubes,
(b) attaching said tubes to each other so that their axes are in parallel to produce a structure of hollow tubes with passages defined between the tubes,
(c) mounting at least one capacitor in each of said tubes,
(d) connecting one lead of each capacitor to the wall of its associated tube to minimize lead length and the high frequency impedance presented by said lead.

References Cited

UNITED STATES PATENTS 2,824,264   2/1958   Anastopoulos _____ 317—256 X
3,198,990   8/1965   Katzin _____ 317—100

JOHN F. CAMPBELL, Primary Examiner

C. E. HALL, Assistant Examiner

U.S. Cl. X.R.

29—25.42, 630